(12) United States Patent
Spreeuwers et al.

(10) Patent No.: US 7,313,258 B2
(45) Date of Patent: *Dec. 25, 2007

(54) METHOD, APPARATUS AND SOFTWARE FOR ANALYZING PERFUSION IMAGES

(75) Inventors: Lieuwe Jan Spreeuwers, Amersfoort (NL); Marcel Breeuwer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 802 days.

This patent is subject to a terminal disclaimer.

(21) Appl. No.: 10/601,943

(22) Filed: Jun. 23, 2003

(65) Prior Publication Data

US 2004/0066961 A1   Apr. 8, 2004

(30) Foreign Application Priority Data

Jun. 21, 2002   (EP)   ................................. 02077494

(51) Int. Cl.
 *G06K 9/00*   (2006.01)
(52) U.S. Cl. .................. 382/128; 382/294; 378/28
(58) Field of Classification Search ........ 382/128–133, 382/151, 169, 178, 194, 209, 274, 255–260, 382/278, 285, 294, 305; 600/410, 413, 425, 600/427; 378/23, 28; 356/39; 250/453.11; 348/43, 46; 128/200.16
See application file for complete search history.

(56) References Cited

U.S. PATENT DOCUMENTS

| | | | | |
|---|---|---|---|---|
| 5,647,360 A | * | 7/1997 | Bani-Hashemi et al. | 600/425 |
| 5,850,486 A | * | 12/1998 | Maas et al. | 382/294 |
| 5,970,182 A | * | 10/1999 | Goris | 382/278 |
| 6,222,948 B1 | * | 4/2001 | Hossack et al. | 382/294 |
| 6,292,683 B1 | * | 9/2001 | Gupta et al. | 600/410 |
| 6,447,450 B1 | * | 9/2002 | Olstad | 600/437 |
| 6,501,979 B1 | * | 12/2002 | Manning et al. | 600/413 |
| 7,024,024 B1 | * | 4/2006 | Aiazian | 382/128 |

OTHER PUBLICATIONS

Declerck et al: "Automatic Registration And Alignment On A Template Of Cardiac Stress And Rest Reoriented SPECT Images" IEEE Transactions On Medical Imaging, IEEE Inc., vol. 16, No. ' 6, Dec. 1, 1997, pp. 727-737.*

* cited by examiner

*Primary Examiner*—Azarian Seyed

(57) ABSTRACT

The invention relates to a method for analyzing perfusion images, in particular MR pertbsion images, of a human or animal organ including the steps of:
(a) defining at least one contour of the organ, and
(b) establishing at least one perfusion parameter of a region of interest of said organ within a boundary defined by the at least one contour, whereby steps (a) and (b) are repeated in a series of iterative steps wherein for each subsequent iterative step the definition of the at least one contour in step (a) is varied, and the series of iterative steps is terminated after reaching an optimal value for the at least one perfusion parameter in step (b).

15 Claims, 2 Drawing Sheets

METHOD, APPARATUS AND SOFTWARE FOR ANALYZING PERFUSION IMAGES

Figure 1:
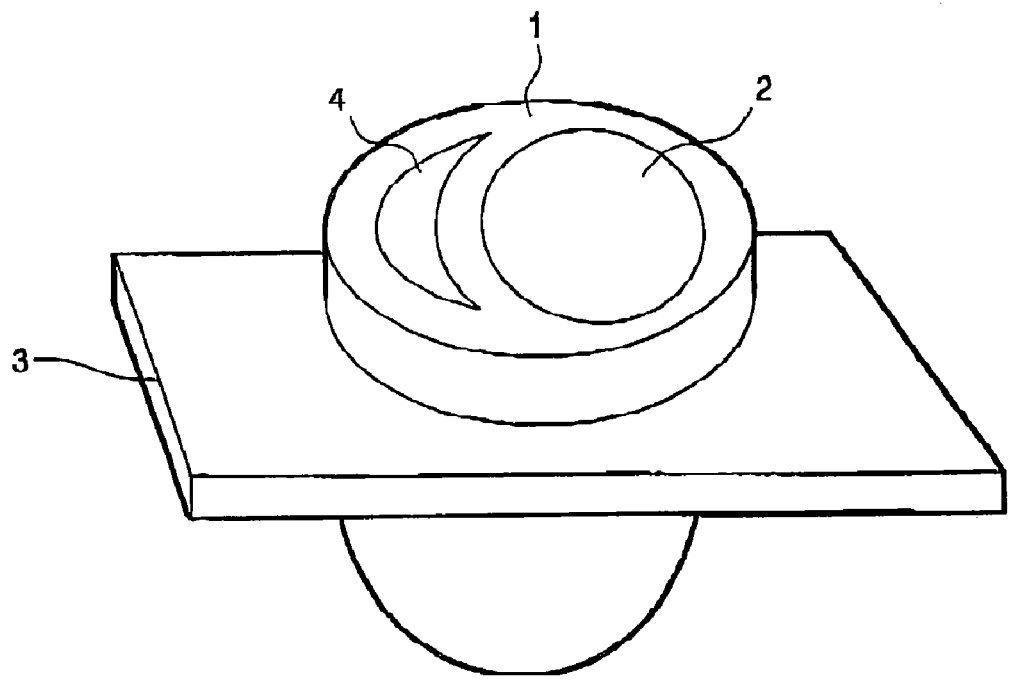

The invention relates to a method for analyzing perfusion images, in particular MR perfusion images, of a human or animal organ including the steps of (a) defining at least one contour of the organ, and (b) establishing at least one perfusion parameter of a region of interest of said organ within a boundary defied by the at least one contour.

From the article "MR perfusion imaging: correlation with PET and quantitative angiography", published in Magnetic Resonance Materials in Physics, Biology and Medicine 11 (2000) 71-72 by J. Sohwitter an G. K. von Schulthess, it is known to apply quantitative tools for obtaining pixelwise slope maps of registered MR perfusion data sets in a method for detecting stenosed coronary arteries from the heart. Analysis of upslope (meaning perfusion rates), rather than other parameters is said to provide a very sensitive and specific measure of myocardial ischemia. Measuring the upslope provides a semiquantitative measure of absolute perfusion, even with patients having triple vessel disease.

The invention aims at improving the method mentioned in the introductory paragraph.

To this end, the method of the invention is characterized in that steps (a) and (b) are repeated in a series of iterative steps wherein for each subsequent iterative step the definition of the at least one contour in step (a) is varied, and the series of iterative steps is terminated after reaching an optimal value for the at least one perfusion parameter in step (b).

By this measure, a very accurate determination of an organ's boundaries is possible allowing for a consequently also very accurate determination of the perfusion parameter or parameters that are to be established.

The method of the invention is particularly useful when the organ is a heart and the region of interest is the heart's myocardium or a segment thereof.

It is remarked, however, that the gist of the invention and the scope of protection afforded hereby is not limited to analyzing perfusion images with respect to the heart's myocardium or one or more segments thereof. The invention may equally well be applied in respect of other organs, for instance the brain. The above and the further explanation below with respect to the analysis of perfusion images of the heart, and in particular the heart's myocardium, serves therefore primarily to elucidate the method without being restricted to that single application.

Preferably, in step (a) the inner contour and/or the outer contour of the heart's myocardium is defined. Although one could restrict the optimization according to the method of the invention to variation of the myocardium's inner contour, particularly good results are attainable if both the inner contour and the outer contour of the hearts myocardium are varied. This variation may occur simultaneously, but it is preferred to execute the variations subsequently.

Suitably the perfusion parameter to be established is selected from the group comprising mean upslope, time to peak intensity, time of contrast arrival, time to half maximum intensity, accumulated inflow or combinations thereof. It is found particularly advantageous however that in step (b) the perfusion rate (or upslope), and/or the time at which the maximum perfusion rate occurs is established. These parameters provide effective indication of the perfusion of the organ being analyzed.

In case the myocardium's inner contour is varied, the method of the invention is particularly well applied by clouting the series of iterative steps and terminating these series after reaching an essentially constant value for the perfusion rate and/or said time at which the maximum perfusion rate occurs, as compared to the perfusion rate's value and/or time in a previous iterative step.

The invention is for embodied in a software program for a computer of an apparatus that is implemented to execute the method for analyzing perfusion images as explained above.

The invention is further embodied in an apparatus that is apparently intended to execute said method.

The invention shall now be further elucidated with reference to the following non-limiting exemplary embodiment of the invention with reference to the drawing.

Figure 2:
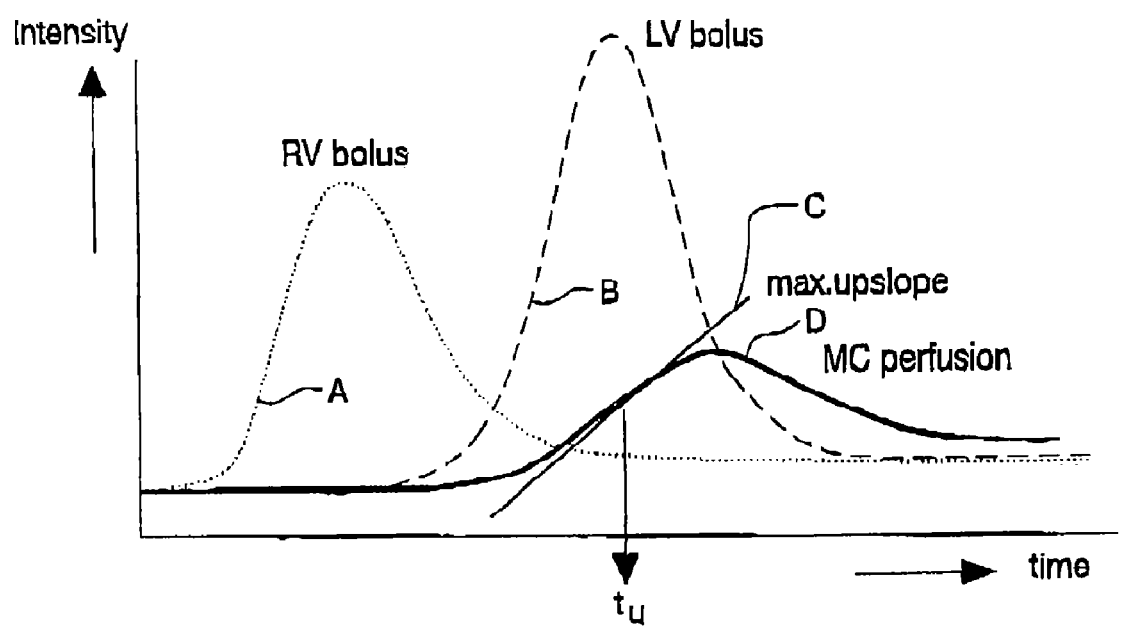
Figure 3:
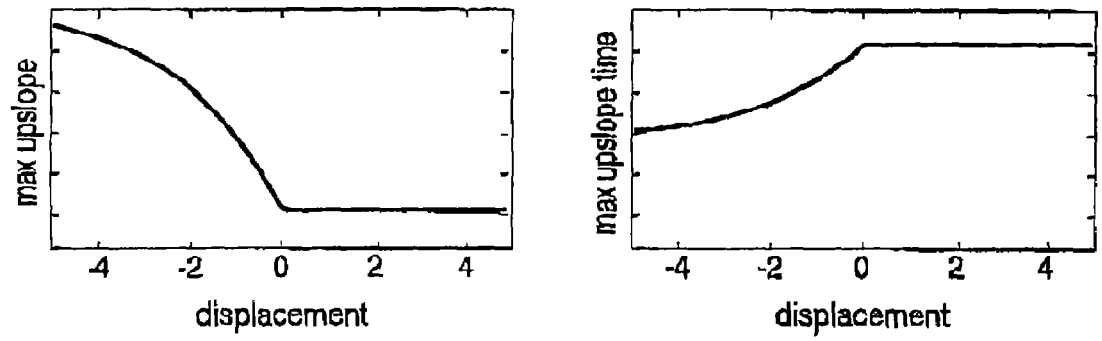
Figure 4:
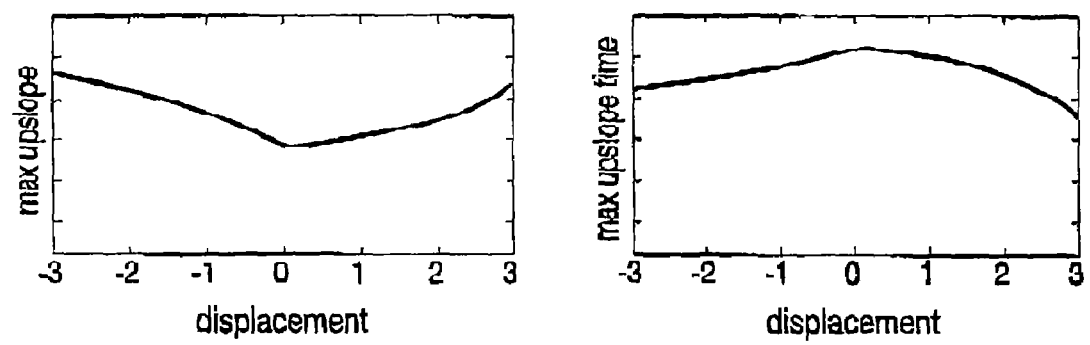

In the drawing it is shown in:

FIG. 1: a short axis slice through a heart;

FIG. 2: intensity time curves of a bolus passage through sections of the heart;

FIG. 3: perfusion parameters varying depending on radial displacement of an inner myocardial boundary; and FIG. 4: variations of perfusion parameters depending on displacements of a myocardial outer boundary.

In the example, the method for analyzing the perfusion images relates to the myocardium 1 of the left ventricle 2 of a heart (see FIG. 1). Reduced blood perfusion of the myocardium 1 of the left ventricle 2 is a direct result of cardiovascular diseases. For measuring the perfusion of the myocardium 1, a contrast fluid is applied whilst the patient's heart is monitored with MR or other imaging techniques. That are known per se. The images are obtained by making scans of slices 3 through the myocardium 1 during a period of 20 to 40 seconds. In an image sequence, it can be monitored that the contrast fluid first enters the right ventricle 4, then the left ventricle 2, and finally the myocardium 1.

The perfusion of these parts of the heart is imaged and the imaging is supported by the contrast agent. The intensity of the measurement as recorded in time, is shown in FIG. 2. The X-axis of FIG. 2 shows time as an independent variable, whilst the Y-axis shows the intensity of the measured perfusion. The Figure clearly shows that the contrast agent first enters the right ventricle. This is shown by graph A. Subsequently, the contrast agent arrives at the left ventricle as shown by graph B. Finally the contrast agent arrives at the myocardium as shown by graph C. The intensity time curve C pertaining to the myocardium is used for analyzing the perfusion of the myocardium.

Since the signal in the myocardium 1 is very noisy, generally the myocardium 1 is divided into segments and the measurements are averaged over these segments. These segments preferably coincide with areas of the myocardium 1 which are supplied with blood from a certain coronary artery. In this way, if a reduced perfusion is observed in a myocardial segment, it can be traced back to the supplying artery.

Since the signal strengths in the left 2 and right 4 ventricles are much higher than in the myocardium 1, extreme care should be taken not to include any part of the left and right ventricles into the myocardial segments. This is not as easy as it seems, since the boundaries of the left and ventricle blood volumes can be very irregular due to the presence of papilar muscles and trabeculae.

Also the boundaries of the myocardium 1 are often not clearly visible in a single image of the sequence or even on a maximum intensity projection through time. Furthermore, the images generally have a rather low resolution (typically 128*128 pixels) and only a few pixels are available for averaging within a segment.

The parameters that are of interest in analyzing the perfusion are on the one hand the perfusion rate or upslope as indicated in FIG. 2 with line D in relation to graph C, and on the other hand the time $t_u$ at which the maximum perfusion rate occurs. FIG. 2 relates to a specific situation with a fixed inner boundary and outer boundary of the myocardium 1.

FIGS. 3 and 4 show the results with a varying diameter of inner contour and outer contour of myocardium 1 respectively, and the resulting value of the maximum upslope or maximum perfusion rate, and the time at which this maximum perfusion rate occurs (see FIGS. 3 and 4 left and right respectively).

The X-axis of FIGS. 3 and 4 shows as the independent variable a variation of the concerning contour of the myocardium (FIG. 3: inner contour; FIG. 4: outer contour).

From FIG. 3 is follows that when the myocardium's inner contour is varied, eventually the above-mentioned perfusion parameters reach an essentially constant value, whilst further variation of the inner contour, i.e. a diminishing diameter beyond the point at which the constant value is reached, does no longer effect either the maximum perfusion rate or the time at which such maximum perfusion rate occurs. The point beyond which fisher variation of the inner contour does no longer effect the perfusion parameters is then established to represent the measured inner contour that most accurately corresponds to the true boundary of the myocardium.

Likewise, when varying the outer contour of tae myocardium, an optimal value of both the perfusion rate and the time at which the maximum perfusion rate occurs, can be established (see FIG. 4). The outer contour value corresponding to these optimal values is then taken to accurately represent the actual outer boundary of the myocardium.

When one or more optimal values of the said perfusion parameters are established, further iteration by repeatedly defining a contour of the organ and subsequently establishing at least one perfusion parameter of the analyzed region of interest of the organ can be terminated. In this way, an accurate method for detecting the myocardial contours is defined that ensures that no part of the left ventricle 2 or right ventricle 4 is included in the perfusion images of the myocardium 1.

The invention claimed is:

1. Method for analyzing perfusion images, in particular MR perfusion images, of a human or animal organ including the steps of
   (a) defining at least one contour of the organ, and
   (b) establishing at least one perfusion parameter of a region of interest of said organ within a boundary defined by the at least one contour,
      characterized in that steps (a) and (b) are repeated in a series of iterative steps wherein for each subsequent iterative step the definition of the at least one contour in step (a) is varied, and the series of iterative steps is terminated after reaching an optimal value for the at least one perfusion parameter in step (b).

2. Method according to claim 1, characterized in that the organ is a heart and the region of interest is the heart's myocardium or a segment thereof.

3. Method according to claim 2, characterized in that in step (a) the inner contour and/or the outer contour of the heart's myocardium is defined.

4. Method according to claim 1, characterized in that in step (b) the perfusion rate or upslope and/or the time at which the maximum perfusion rate occurs is established.

5. A computer readable medium encoded with a computer program to execute the method according to claim 1.

6. Apparatus comprising means to execute the method according to claim 1.

7. Method for analyzing perfusion images, in particular MR perfusion images, of a human or animal organ including the steps of
   (a) defining at least one contour of the organ, and
   (b) establishing at least one perfusion parameter of a region of interest of said organ within a boundary defined by the at least one contour,
      characterized in that steps (a) and (b) are repeated in a series of iterative steps wherein for each subsequent iterative step the definition of the at least one contour in step (a) is varied, and that in step (b) the myocardium's inner contour is varied and that the series of iterative steps is terminated after reaching an essentially constant value for the perfusion rate or upslope and/or said time at which the maximum perfusion rate occurs, as compared to the perfusion rate's value and/or time in a previous iterative step.

8. Software program for a computer of an apparatus implemented to execute a method for analyzing perfusion images, in particular MR perfusion images, of a human or animal organ including the steps of
   (a) defining at least one contour of the organ, and
   (b) establishing at least one perfusion parameter of a region of interest of said organ within a boundary defined by the at least one contour,
      characterized in that steps (a) and (b) are repeated in a series of iterative steps wherein for each subsequent iterative step the definition of the at least one contour in step (a) is varied, and the series of iterative steps is terminated after reaching an optimal value for the at least one perfusion parameter in step (b).

9. Software program according to claim 8, characterized in that in step (a) the inner contour and/or the outer contour of the heart's myocardium is defined.

10. Software program according to claim 8 or 9, characterized in that in step (b) the perfusion rate or upslope and/or the time at which the maximum perfusion rate occurs is established.

11. Software program for a computer of an apparatus implemented to execute a method for analyzing perfusion images, in particular MR perfusion images, of a human or animal organ including the steps of
   (a) defining at least one contour of the organ, and
   (b) establishing at least one perfusion parameter of a region of interest of said organ within a boundary defined by the at least one contour,
      characterized in that steps (a) and (b) are repeated in a series of iterative steps wherein for each subsequent iterative step the definition of the at least one contour in step (a) is varied and the inner contour and/or the outer contour of the heart's myocardium is defined, and in step (b) the perfusion rate or upslope and/or the time at which the maximum perfusion rate occurs is established, the myocardium's inner contour is varied and that the series of iterative steps is terminated after reaching an essentially constant value for the perfusion rate and/or said time at which the maximum perfusion rate occurs, as compared to the perfusion rate's value and/or time in a previous iterative step or after reaching an optimal value for the at least one perfusion parameter.

12. Apparatus for analyzing perfusion images, in particular MR perfusion images, of a human or animal organ, arranged to execute the steps of
   (a) defining at least one contour of the organ, and
   (b) establishing at least one perfusion parameter of a region of interest of said organ within a boundary defined by the at least one contour,
      characterized in that during operation steps (a) and (b) are repeated in a series of iterative steps wherein for each subsequent iterative step the definition of the at least one contour in step (a) is varied, and the series of iterative steps is terminated after reaching an optimal value for the at least one perfusion parameter in step (b).

13. Apparatus according to claim 12, characterized in that in step (a) the inner contour and/or the outer contour of the heart's myocardium is defined.

14. Apparatus according to claim 12 or 13, characterized in that in step (b) the perfusion rate or upslope and/or the time at which the maximum perfusion rate occurs is established.

15. Apparatus for analyzing perfusion images, in particular MR perfusion images, of a human or animal organ, arranged to execute the steps of
   (a) defining at least one contour of the organ, and
   (b) establishing at least one perfusion parameter of a region of interest of said organ within a boundary defined by the at least one contour,
      characterized in that steps (a) and (b) are repeated in a series of iterative steps wherein for each subsequent iterative step the definition of the at least one contour in step (a) is varied and the inner contour and/or the outer contour of the heart's myocardium is defined, and in step (b) the perfusion rate or upslope and/or the time at which the maximum perfusion rate occurs is established, the myocardium's inner contour is varied and that the series of iterative steps is terminated after reaching an essentially constant value for the perfusion rate and/or said time at which the maximum perfusion rate occurs, as compared to the perfusion rate's value and/or time in a previous iterative step or after reaching an optimal value for the at least one perfusion parameter.

* * * * *